US005865089A

United States Patent [19]

Langer et al.

[11] Patent Number: 5,865,089

[45] Date of Patent: Feb. 2, 1999

[54] LINEAR THRUSTER

[76] Inventors: John W. Langer, Hamilton Rd., Sturbridge, Mass. 01566; Michael T. Starr, 16 Old Faith Rd., Shrewsbury, Mass. 01545

[21] Appl. No.: 934,247

[22] Filed: Sep. 19, 1997

[51] Int. Cl.[6] .............................. F01B 31/00; F16J 15/18

[52] U.S. Cl. .................... 92/110; 92/165 R; 92/165 PR; 901/22

[58] Field of Search .......................... 92/165 R, 165 PR, 92/110, 111, 261, 88; 60/453; 901/22, 37

[56] References Cited

U.S. PATENT DOCUMENTS

| | | | |
|---|---|---|---|
| 2,008,128 | 7/1935 | Condon et al. | 92/165 PR X |
| 3,563,136 | 2/1971 | Valenti | 91/411 |
| 4,130,205 | 12/1978 | Luthi | 214/1 BB |
| 4,716,803 | 1/1988 | Waltonen . | |
| 4,750,408 | 6/1988 | Stoll | 92/165 PR X |
| 4,961,372 | 10/1990 | Leonhartsberger | 92/165 R X |
| 5,172,625 | 12/1992 | Latham | 92/165 R X |
| 5,299,489 | 4/1994 | Obrecht et al. | 92/165 R X |
| 5,469,775 | 11/1995 | Stoll et al. | 92/88 |
| 5,609,091 | 3/1997 | Stoll | 92/110 |

FOREIGN PATENT DOCUMENTS

| | | |
|---|---|---|
| 55103250 | 8/1980 | Japan . |
| 5686210 | 7/1981 | Japan . |

*Primary Examiner*—John E. Ryznic
*Attorney, Agent, or Firm*—Lockwood, Alex, Fitzgibbon & Cummings

[57] ABSTRACT

A linear thruster is disclosed in which a load beam is linearly moved relative to a guide beam by fluid power. One or both of the beams are multisided in cross-section to substantially increase the linear bearing area between the beams and substantially increase the strength of the linear thruster against side forces as well as moments while permitting a substantial reduction in the volumetric space consumed by the linear thruster. The fluid power and the energy inputs to the linear thruster may all be positioned at one end of the guide beam.

22 Claims, 2 Drawing Sheets

LINEAR THRUSTER

BACKGROUND AND SUMMARY OF INVENTION

The present invention is directed to linear thrusters and, more particularly, to fluid operated linear thrusters which are significantly stronger yet more compact than the prior linear thrusters.

A wide variety of fluid operated linear thrusters have been available in the past. These have been employed for example for the positioning of work pieces or tools on production lines. These prior linear thrusters typically are non-rotatable and include a fluid operated piston and cylinder which moves a tool plate back and forth in a linear reciprocating fashion, and a pair of spaced shafts which are supported by linear slide bearings, and which stabilize the thruster against rotation and strengthen it against side forces and moments during operation. Although the prior linear thrusters have performed adequately well in the many applications in which they have been used, their usefulness is somewhat limited by the maximum side loads, moments and deflection to which they may be subjected during use, particularly at their maximum stroke. The maximum loads and moments that can be accommodated by the prior linear thrusters rapidly decrease in magnitude as the stroke length of the linear thrusters increases. Thus, either the loads, moments and/or deflections must be limited for a given sized and stroke linear thruster, and if greater loads, moments or deflections must be accommodated, the size, bulkiness and volumetric space requirements of the prior linear thrusters must also be substantially increased.

It has been discovered that deflection can be substantially decreased and maximum side loads and moments can be substantially increased simply and easily by a linear thruster incorporating the principles of the present invention, while at the same time reducing the complexity and expense of the linear thrusters of the present invention. Moreover, “pinch points” which frequently existed in the typical prior linear thruster constructions, i.e. locations between which human body parts may be caught or pinched as the parts of the thruster move relative to each other, can be essentially eliminated in the linear thrusters incorporating the principles of the present invention. Significantly, the volumetric space requirements of the linear thrusters of the present invention also may be substantially and considerably reduced over the requirements of the prior linear thrusters, thereby permitting substantial miniaturization and increased compactness of systems incorporating the linear thrusters of the present invention. The linear thrusters of the invention are also receptive to the internal placement of many of the components which were previously mounted externally of the thruster, and all of the fittings for the operating fluid as well as for introducing energy to the tool or tools on the distal end of the thruster may be positioned at one end of the thruster to further facilitate increased volumetric space efficiency and compactness. Moreover, the linear thruster incorporating the principles of the invention may be readily adapted for clean room applications.

In one principal aspect of the present invention, a fluid operated linear thruster comprises a guide beam having an elongate passage therein defined by internal walls in the guide beam, and a load beam positioned in the passage of the guide beam for reciprocation therein. The load beam has an outer wall which is sized and shaped so as to be supported and guided at least at two spaced locations on the internal walls of the guide beam during reciprocation of the load beam in the passage of the guide beam, and at least one of the aforementioned passage of the load beam and/or outer wall of the load beam is multisided in cross-section. A mounting is located on the load beam to mount a load on the load beam for movement with the reciprocating load beam. A piston is located in the load beam and a fluid inlet communicates a source of fluid under pressure to at least one side of the piston to urge the load beam to reciprocally move in the passage between a first position and a second position while being supported and guided by the aforementioned at least two spaced locations.

In another principal aspect of the present invention, both the passage in the guide beam and the outer wall of the load beam are multisided in cross-section, and preferably square in cross-section.

In still another principal aspect of the present invention, the passage in the guide beam is multisided in cross-section, and the outer wall of the load beam is substantially circular cross-section.

In still another principal aspect of the present invention, the load beam is located substantially within the guide beam when it is in its first position, the guide beam has first and second opposite ends, and the load beam extends from the first end of the guide beam when the load beam is in its aforementioned second position.

In still another principal aspect of the present invention, a cylinder is positioned in the load beam, and the cylinder has the aforementioned piston therein and is mounted to the second end of the guide beam, and a piston rod is on the piston and mounted to the load beam to move the load beam between the first and second positions.

In still another principal aspect of the present invention, the fluid inlet includes at least first and second fluid inlets to communicate a source of fluid under pressure to opposite sides of the piston to urge the load beam in opposite directions, and both the first and second fluid inlets are positioned on the guide beam adjacent the second end of the guide beam.

In still another principal aspect of the present invention, an energy input is located on the guide beam adjacent its second end, and the energy is communicated between the energy input and the aforementioned mounting and within the passage of the guide beam to communicate the energy from the energy input to the mounting when the load beam is in its second position and in which it is extended from the guide beam.

In still another principal aspect of the present invention, the aforementioned energy may be fluid under pressure and/or electrical.

In still another principal aspect of the present invention, at least one channel may be formed on the exterior of the guide beam, and a fastening may engage the channel for mounting the linear thruster to a base.

In still another principal aspect of the present invention, the guide beam includes a vent to vent the passage of the guide beam to the exterior of the guide beam, and the vent may be a vacuum line.

These and other objects, features and advantages of the present invention will be more clearly understood through a consideration of the following detailed description.

BRIEF DESCRIPTION OF THE DRAWINGS

In the course of this description reference will frequently be made to the attached drawings in which.

DESCRIPTION OF THE PREFERRED EMBODIMENTS

Figure 1:
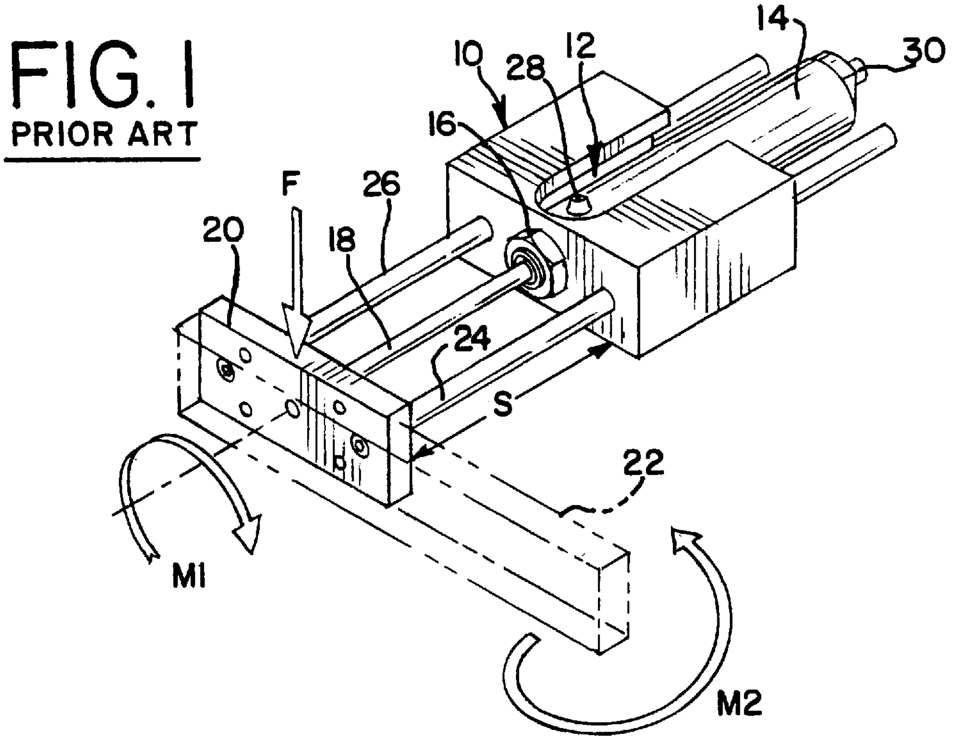
FIG. 1 PRIOR ART
FIG. 1 is an overall, perspective view of a fluid powered linear thruster of the kind typical of the prior art.

A typical prior linear thruster is shown in FIG. 1 for comparative purposes. Such prior linear thrusters typically included a housing 10 having a slotted elongate bay 12 in its central portion for receiving an air cylinder body 14 which was stationarily mounted in the bay, e.g. by a threaded nut 16. The air cylinder body 14 also typically included a reciprocating piston (not shown) in the body, and a piston rod 18 which extended from the body 14 and housing 10 as seen in FIG. 1 for reciprocation with the piston over the stroke length S. A tooling plate 20 was also typically mounted at the end of the piston rod 18, as shown in FIG. 1, for reciprocation back and forth with the piston rod and for attachment either directly thereto of working tools to be positioned by the linear thruster, or of a larger work piece plate 22 mounted to the plate 20 for carrying such tools (not shown).

These prior linear thrusters also typically included one or more guide shafts 24 and 26 which at one end were fixed to the tooling plate 20, which straddled the piston rod 18 as shown in FIG. 1, and which were positioned to slidably extend into and through the housing 10 as shown. The principal function of these guide shafts 24 and 26 was to stabilize the tooling plate 20 against rotation in the direction shown for example by the arrow M1 in FIG. 1. Such rotation would otherwise occur due to the round nature of the piston (not shown) in the cylinder body 14, and also the round piston rod 18, neither of which present much resistance to rotation. In addition, the guide rods 24 and 26 also provided strengthening not only against the rotational moment M1 but also the rotational moment M2 and the side force F all as shown in FIG. 1.

Fluid pressure fittings 28 and 30 were also typically provided at each end of the body 14 in order to operate the cylinder body 14 and its piston. When pressurized fluid was admitted through fitting 28, the piston moved to the right as viewed in FIG. 1 and any fluid in the cylinder body on the other side of the piston was exhausted through fitting 30. When it was desired to move the piston to the left as viewed in FIG. 1, these conditions were reversed.

Upon consideration of the foregoing description of the typical prior art linear thrusters such as shown in FIG. 1, it will be appreciated that they suffered several shortcomings. One such shortcoming is that even though the guide shafts 24 and 26 do provide some measure of strengthening and reinforcement against the moments M1 and M2, the side force F and deflection, this strengthening rapidly diminishes as the stroke S increases. A second shortcoming of the prior linear thrusters is that the width of the housing 10 must of necessity be relatively substantial and, greater than the width of the cylinder body 14, in order to accommodate the slide function of the straddling, transversely spaced guide shafts 24 and 26. Thus, considerable volumetric space is needed, and this need tends to defeat compactness and the ability to miniaturize the prior linear thrusters. Thirdly, due to the cylinder-piston construction of the cylinder body 14 in the prior linear thrusters, it is typically necessary to space the fluid fittings 28 and 30 at opposite ends of the cylinder body and to provide fluid conduits or hoses to the fittings on the exterior of the thruster. Also any fluids or electrical energy to be communicated to the tooling plate 20 was also accomplished externally by hoses or the like which were subject to damage and pinching during operation of the thruster. These external components also tend to defeat miniaturization, and increase the complexity of the thruster and the exposure of these parts to possible damage in use. Moreover, it will be appreciated that the space between the tooling plate 20 and housing 10 results in a large pinch area during the operation of the thruster which could be detrimental to safety.

Figure 2:
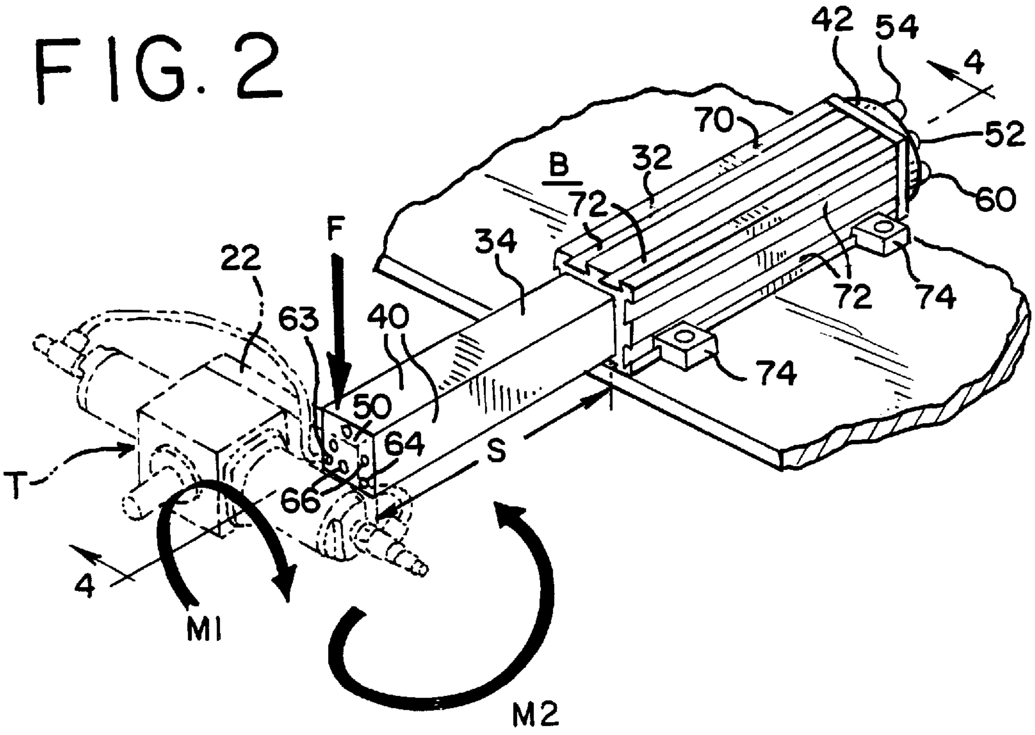
FIG. 2 is an overall, perspective view of a fluid powered linear thruster incorporating the principles of the present invention.
Figure 3:
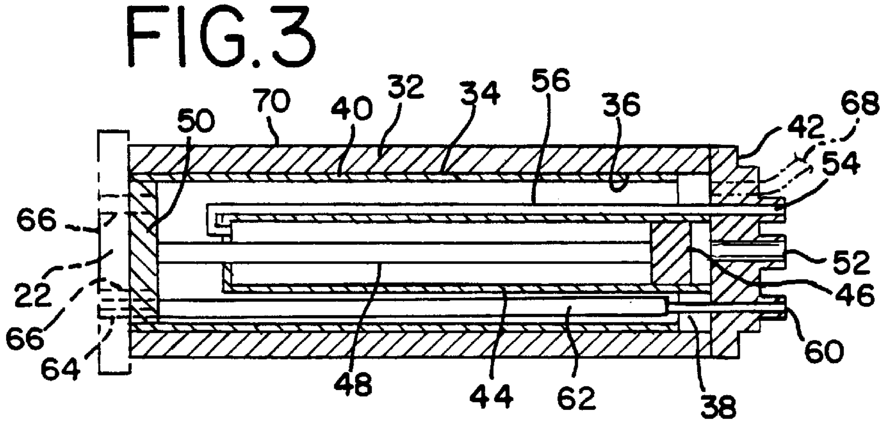
FIG. 3 is a cross-sectioned, side elevation view of the linear thruster of the present invention and as substantially shown in FIG. 2, but in which the thruster is shown in its retracted position.
Figure 4:
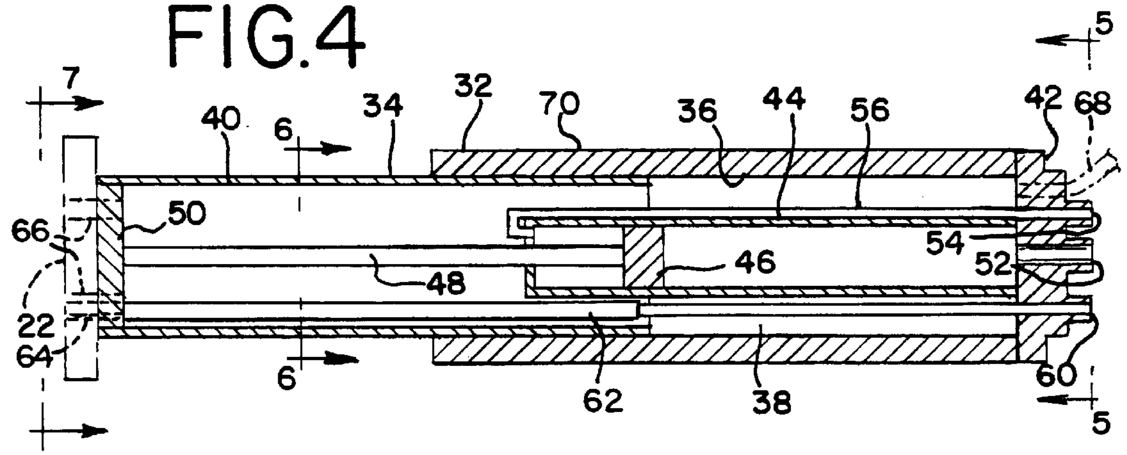
FIG. 4 is a cross-sectioned, side elevation view of the linear thruster of the present invention, and in which the thruster is shown in an extended position and as viewed substantially along line 4—4 of FIG. 2.
Figure 5:
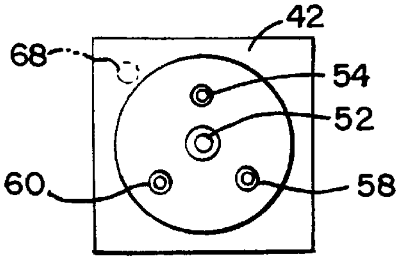
FIG. 5 is an end elevation view of the linear thruster as viewed substantially along line 5—5 of FIG. 4.
Figure 6:
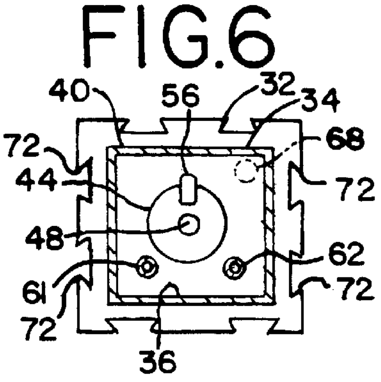
FIG. 6 is a cross-sectioned, end elevation view of the linear thruster as viewed substantially along line 6—6 of FIG. 4.

With particular reference now to FIGS. 2–7, one preferred embodiment of linear thruster constructed in accordance with the principles of the present invention is shown. This linear thruster comprises a pair of beams including a guide beam 32 and a slightly smaller in cross-section load beam 34. The guide beam 32 has a plurality of inner walls 36, as best seen in FIGS. 3, 4 and 6, which generally define a passage 38 which, as seen in the drawings, is multisided in cross-sectional shape, and preferably substantially polygonal in shape, and even more preferably square in cross-section as shown in the drawings. As employed in the present invention, the term "multisided" includes planar geometric shapes having a plurality of sides and/or angles and preferably two or more sides and/or angles, and the sides may or may not either be flat or equilateral in length, although equilateral lengths are presently preferred due to ease of manufacture. Although at least some of the sides are preferably substantially flat, they need not be to be "multisided" according to the invention, so long is there are angles between at least some of the sides, such as semicircular, scalloped, heart or kidney shaped in cross-section.

Figure 7:
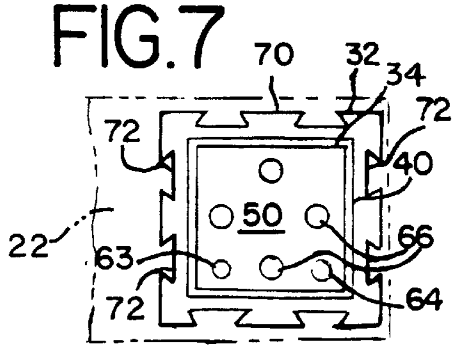
FIG. 7 is an end elevation view of the linear thruster as viewed substantially along line 7—7 of FIG. 4.

The load beam 34 is formed by a plurality of outer walls 40 which are also substantially multisided in cross-section, and are also preferably square as shown in FIGS. 6 and 7. The cross-sectional dimensions of the load beam 34, however, are somewhat smaller than the overall cross-section of the guide beam 32 so that the second body 34 is adapted to be received into the passage 38, is reciprocally moveable in the passage and will be linearly supported and guided over a considerable number and/or size of spaced locations or areas on the interior walls 36 of the guide beam 32 for the reasons and in the manner to be discussed below.

With particular reference to FIGS. 3 and 4, an end closure plate 42 is mounted to and at one end of the guide beam 32. A cylinder body 44 is positioned in the guide and load beams 32 and 34 and is fixed at one end to the inside of the end closure plate 42. A piston 46 is positioned in the cylinder body 44 for reciprocation back and forth therein. A piston rod 48 is fixed at one of its ends to the piston 46, and at its other end to an end closure tooling plate 50 which, in turn, is mounted to and at the distal end of the load beam 34 and opposite the end closure plate 42 of the guide beam 32.

Fluid fittings 52 and 54 are also positioned on the end closure plate 42 as best seen in FIGS. 2–5, with the fluid fitting 54 communicating via conduit 56 to the left end of the cylinder body 44, as best seen in FIGS. 3 and 4. Thus, it will be seen that due to the complimentary multisided cross-sections of the respective beams 32 and 34, space is available to readily accommodate the conduit 56 to port fluid internally to the left end of the cylinder while permitting both fittings 52 and 54 to be positioned on the right end of the guide beam 32. If desired, additional fittings 58 and 60 may also be provided on the end closure plate 42 to communicate either fluid or electrical energy through the interior of the beams 32 and 34 to the end closure tooling plate 50 and its work piece plate 22 to operate a power tool T which might be positioned there to operate the tool T when the load beam 34 is extended as shown in FIGS. 2 and 4. For example for this purpose two or more telescoping conduits 61 and 62 may extend through passage 38 between the end closure plate 42 and the end closure tooling plate 50 as shown in FIGS. 3, 4 and 6 to conduct fluid under pressure to passages 63 and 64 in the tooling plate 50. In the alternative one or both of the telescoping conduits 61 and 62 may be telescoping electrical conductors if the energy to be transmitted is electrical. As previously mentioned, because some or all of these fittings can be positioned on one end of the guide beam 32, miniaturization and compactness of the linear thruster is facilitated and the conduits and energy transmitting components can be protected against damage.

The tool T to be positioned by the linear thruster of the present invention may be mounted either directly to the end closure tooling plate 50, as it may have been mounted to the work piece plate 20 in the prior art linear thruster as shown in FIG. 1, or to an enlarged work piece plate 22, such as shown in FIGS. 2–4. The work piece plate 22 may be mounted by bolts 66 to the tooling plate 50.

The chamber 38 is also preferably vented through end closure plate 42 by a suitable vent in order to permit unhindered movement of the load beam 34 between its extended and retracted positions. If the linear thruster is to operate in a “clean room” environment, the vent may take the form of a vacuum conduit 68, as shown in dot and dash in FIGS. 3, 4 and 6, to insure that any contaminants that may be present in the chamber 38 as a result of the operation of linear thruster are removed.

If desired, two or more of the exterior walls 70 of the guide beam 32 may be formed so as to facilitate fastening or mounting of the linear thruster to some form of rigid base foundation B as seen in FIG. 2. This may include for example longitudinally extending dovetail channels 72 which may machined or extruded into the exterior walls 70 of the guide beam 32 to receive bolt holddown lugs 74 as seen in FIG. 2.

Although it is believed that the operation and substantially improved performance and advantages will be apparent to those skilled in the art from the foregoing description of the preferred embodiment of linear thruster of the invention, a brief description of the operation and function follows for the embodiment of linear thruster of invention shown in FIGS. 2–6.

Assuming that the linear thruster is to be moved to its retracted position as shown in FIG. 3, fluid under pressure will be admitted through the fluid fitting 54 to pass through the conduit 56 and exert a force on the left side of the piston 46 to drive the piston to the right as viewed in FIG. 3. When the piston 46 is moved to the right, its piston rod 48 will pull the end closure tooling plate 50 to the right together with the load beam 34 to which it is mounted. Movement to the right may be limited for example by the work piece plate 22 coming to rest against the left end of the guide beam 32 as viewed in FIG. 3. However, it will be appreciated that movement of the piston either to the right or left may be and preferably is limited, as is known in the prior art, by a sensor or sensors (not shown) which sense the linear position of the piston 46, and which control valves (not shown) for controlling the flow of fluid through fluid fittings 52 and 54.

When it is desired to advance the end closure tooling plate 50 and/or work piece plate 22 with its tools (not shown) away from the guide beam 32, fluid under pressure is admitted to the fluid fitting 52 to the right side of the piston 46, as viewed in the drawings, and any fluid remaining in the cylinder body 44 to the left of the piston 46 may be exhausted through the conduit 56 and fluid fitting 54. In this condition, piston 46 and its piston rod 48 will move to the left, as shown in FIG. 4. This will cause the end closure tooling plate 50, which is fixed to the end of the load beam 34, to move that cylinder body 34 in the passage 38 from its first furthest right position shown in FIG. 3, to a second extended position as shown in FIG. 4. Such movement will also cause the work piece plate 22 which may be fixed to the tooling plate 50 to move to the advanced second position, as shown in FIG. 4, and so as to advance and position whatever tools may be mounted to the work piece plate 22, such as tool T as shown in FIG. 2.

In view of the foregoing, it will be appreciated that due to the multisided shaped cross-section of the inner walls 36 of the guide beam 32 and its passage 38, together with the substantially complementary multisided cross-sectional shape of the outer walls 40 of the load beam 34, the linear bearing surface areas of the respective walls of the guide and load beams are substantially greater than the relatively small linear bearing surface areas provided by the piston rod 18 and guide shafts 24 and 26 of the prior linear thrusters. This substantially greater linear bearing surface area afforded by the multisided or polygonal construction of the preferred embodiment of linear thruster of the present invention substantially strengthens the linear thruster of the invention against the moments M1 and M2 as shown in FIG. 2, as well as against the side load forces F, and will substantially reduce deflection, all without any increase in volumetric space occupied by the linear thruster. Indeed, the structural complexity of the thrusters of the present invention is greatly simplified, the expense is reduced and the volumetric space consumed by the polygonal cross-sectioned linear thrusters of the invention is actually substantially decreased because the laterally spaced guide shafts 24 and 26 of the prior linear thrusters may be eliminated and the width of the housing substantially reduced due to such elimination. The guide shafts 24 and 26 are no longer necessary in the present invention to prevent rotation of the tool plate 22 in the direction of the arrow M1 shown in FIGS. 1 and 2 because any such rotation is precluded by the multisided cross-sectional shape of the beams 32 and 34 of the invention. Furthermore, it will be seen that because the load beam 44 may be readily enclosed with space to spare within the multisided cross-sectioned guide and load beams 32 and 34, as shown in FIGS. 3 and 4, the pressure fluid plumbing may also be located interior of the linear thruster and, therefore, the fluid fittings 52 and 54 both may be located at the same end of the guide beam 32 rather than at opposite ends. Moreover, fittings for transporting energy to the tooling plate 50 may also be located at that other end, and the energy may be communicated through the interior of the linear thruster. All this permits further miniaturization and maximizes the ability to locate components within the interior of the thruster so as to present a clean profile and protect the components during operation and use. In addition, it will be appreciated that in the preferred embodiment of linear thruster of the present invention any major "pinch points" that might have been present in the prior linear thrusters are virtually eliminated, for example between the left end of housing 10 and the right face of the work piece plate 20 as viewed in FIG. 1. This substantially reduces the possibility of serious personnel injury during use.

Figure 8:
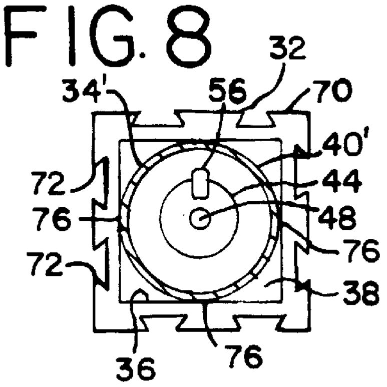
FIG. 8 is a cross-sectioned end elevation view of a second embodiment of linear thruster similar to that shown in FIG. 6, but in which one of the bodies of the linear thruster is circular in cross-section, rather than multisided.

A slightly modified embodiment of the linear thruster from the embodiment as thus far described is shown in FIG. 8. In this embodiment the load beam 34' is shown as having a generally circular cross-section rather than the polygonal or square cross-sections of the load beam 34 as previously described. In this embodiment the strength of the linear thruster will also be increased over its stroke S to better resist the moments M1 and M2 and the side force F as shown in FIGS. 1 and 2. This is due to the still considerable linear bearing surfaces presented by the spaced linear contact locations 76 as shown in FIG. 8 between the outer wall 40' of the circular load beam 34' and the inner walls 36 of the guide beam 32, although the linear bearing areas will not be as great as where both bodies 32 and 34 are of similar complementary polygonal cross-section which would provide support over larger areas.

It will be appreciated, however, that if rotation is not desired some provision will probably be further made in the embodiment shown in FIG. 8, such as a keyway or the like (not shown), to preclude rotation of the second circular cylinder body 34' in the direction shown by the arrow M1 in the drawings. Rotation may also be precluded and strength against the force F and moments M1 and M2 increased by a hybrid cross-sectional shape which is somewhere between the shapes shown in FIGS. 6 and 8, such as where the cross-sectional shape of one or both of the bodies 32 and/or 34 is partially polygonal as shown in FIG. 6 and partially circular as shown in FIG. 8. Such hybrid shapes are also intended to be included within the term "multisided" as employed herein.

Although the term "fluid" as employed herein is preferably a gas or air, it will be appreciated that it may also include liquid.

It will also be appreciated that although the outer walls 40 of the load beam 34 are shown as bearing in direct linear contact against the inner walls 36 of the guide beam 32, either or both of these walls may be suitably coated with a durable and/or friction reducing material, or a sleeve or one or more rings of such material may be interposed between these walls which move relative to each other without departing from the principles of the present invention.

It will also be understood that the preferred embodiments of the present invention which have been described are merely illustrative of the principles of the present invention. Numerous modifications may be made by those skilled in the art without departing from the true spirit and scope of the invention.

We claim:

1. A fluid operated linear thruster, comprising:

a guide beam having first and second opposite ends and an elongate passage therein defined by internal walls in said guide beam;

a load beam positioned in said passage of said guide beam for reciprocation therein, said load beam having an outer wall which is sized and shaped so as to be supported and guided at least at two spaced locations on said internal walls of said guide beam during reciprocation of said load beam in the passage of said guide beam;

at least one of said passage of said guide beam and said outer wall of said load beam being multisided in cross-section;

a mounting located on said load beam to mount a load thereon for movement with said reciprocating load beam;

a piston in said load beam;

a fluid inlet for communicating a source of fluid under pressure to at least one side of said piston to urge said load beam to reciprocally move in said passage between a first position and a second position while being supported and guided by said at least two spaced locations, said load beam extending from said first end of said guide beam when said load beam is in said second position; and a cylinder in said load beam, said cylinder having said piston therein and being mounted to said second end of said guide beam, and a piston rod on said piston, said piston rod being mounted to said load beam to move said load beam between said first and second positions.

2. The linear thruster of claim 1, wherein said passage in said guide beam is multisided in cross-section.

3. The linear thruster of claim 2, wherein said load beam outer wall is also multisided in cross-section.

4. The linear thruster of claim 3, wherein the multisided cross-sections of said internal walls of said guide beam and said outer wall of said load beam, respectively, are of substantially the same shape.

5. The linear thruster of claim 3, wherein said multisided cross-sections are substantially square.

6. The linear thruster of claim 2, wherein said outer wall of said load beam is substantially circular in cross-section.

7. The linear thruster of claim 1, wherein said load beam is located substantially within said guide beam when in said first position.

8. The linear thruster of claim 1, wherein said fluid inlet comprises at least first and second fluid inlets to communicate a source of fluid under pressure to opposite sides of said piston to urge said load beam in opposite directions, and both of said first and second fluid inlets are positioned on said guide beam adjacent said second end of said guide beam.

9. The linear thruster of claim 1, including at least one channel formed on the exterior of said guide beam.

10. The linear thruster of claim 9, including fastening means engaging said channel for mounting said linear thruster to a base.

11. The linear thruster of claim 9, wherein said channel is substantially dovetail in cross-section.

12. The linear thruster of claim 1, wherein said guide beam includes a vent to vent said passage of said guide beam to the exterior of said guide beam.

13. The linear thruster of claim 12, wherein said vent is a vacuum line.

14. A fluid operated linear thruster, comprising:

guide beam having an elongate passage therein defined by internal walls in said guide beam;

a load beam positioned in said passage of said guide beam for reciprocation therein, said load beam having an outer wall which is sized and shaped so as to be supported and guided at least at two spaced locations on said internal walls of said guide beam during reciprocation of said load beam in the passage of said guide beam;

at least one of said passage of said guide beam and said outer wall of said load beam being multisided in cross-section;

a mounting located on said load beam to mount a load thereon for movement with said reciprocating load beam;

a piston in said load beam;

a fluid inlet for communicating a source of fluid under pressure to at least one side of said piston to urge said load beam to reciprocally move in said passage between a first position and a second position while being supported and guided by said at least two spaced locations;

energy input means on said guide beam adjacent said second end of said guide beam; and energy communication means extending between said energy input means and said mounting means and within said passage of said guide beam to communicate the energy from said input means to said mounting means when the load beam is in said second position and in which it is extended from said guide beam.

15. The linear thruster of claim 14, wherein the energy is fluid under pressure and said communication means is a conduit.

16. The linear thruster of claim 14, wherein the energy is electrical.

17. The linear thruster of claim 14, including at least one channel formed on the exterior of said guide beam.

18. The linear thruster of claim 17, including fastening means engaging said channel for mounting said linear thruster to a base.

19. The linear thruster of claim 17, wherein said channel is substantially dovetail in cross-section.

20. The linear thruster of claim 14, wherein said guide beam includes a vent to vent said passage of said guide beam to the exterior of said guide beam.

21. The linear thruster of claim 20, wherein said vent is a vacuum line.

22. The linear thruster of claim 14, wherein said fluid inlet comprises at least first and second fluid inlets to communicate a source of fluid under pressure to opposite sides of said piston to urge said load beam in opposite directions, and both of said first and second fluid inlets are positioned on said guide beam adjacent said second end of said guide beam.

* * * * *